(12) United States Patent
Willis et al.

(10) Patent No.: US 9,243,954 B2
(45) Date of Patent: Jan. 26, 2016

(54) CIRCUIT AND METHOD FOR CONTROLLING AN IR SOURCE FOR AN ANALYTICAL INSTRUMENT

(75) Inventors: Peter M. Willis, Benton Harbor, MI (US); Joshua Allen Slavens, St. Joseph, MI (US)

(73) Assignee: Leco Corporation, St. Joseph, MI (US)

( * ) Notice: Subject to any disclaimer, the term of this patent is extended or adjusted under 35 U.S.C. 154(b) by 729 days.

(21) Appl. No.: 13/400,284

(22) Filed: Feb. 20, 2012

(65) Prior Publication Data

US 2012/0228502 A1 Sep. 13, 2012

Related U.S. Application Data

(60) Provisional application No. 61/451,718, filed on Mar. 11, 2011.

(51) Int. Cl.
*G01J 5/20* (2006.01)
*G01J 3/433* (2006.01)
*G01J 3/10* (2006.01)
*G01J 5/02* (2006.01)
*G01J 5/10* (2006.01)

(52) U.S. Cl.
CPC ................. *G01J 3/433* (2013.01); *G01J 3/108* (2013.01); *G01J 5/02* (2013.01); *G01J 5/10* (2013.01); *G01J 5/20* (2013.01)

(58) Field of Classification Search
CPC .................. G01J 5/02; G01J 5/20; G01J 5/10
USPC ....................................... 250/338.1
See application file for complete search history.

(56) References Cited

U.S. PATENT DOCUMENTS

| | | | | |
|---|---|---|---|---|
| 3,192,411 | A * | 6/1965 | Byrne et al. | 307/107 |
| 4,156,167 | A * | 5/1979 | Sherman | H05B 33/0842 |
| | | | | 315/287 |
| 5,060,309 | A * | 10/1991 | Narita | 398/202 |
| 6,326,620 | B1 | 12/2001 | Willis | |
| 2008/0277586 | A1* | 11/2008 | Cardinale | 250/339.13 |

* cited by examiner

*Primary Examiner* — Christine Sung
(74) *Attorney, Agent, or Firm* — Price Heneveld LLP

(57) ABSTRACT

A pulse-width-modulated voltage is applied to an IR emitter during the on-time of a primary drive voltage having a frequency of about 2.5 Hz in order to control the power to a predetermined desired level. The secondary modulation is at about 800 Hz. The lower response time of the emitter will, in effect, filter the higher frequency, and it will appear that an average power is being applied to the emitter during the on-time.

8 Claims, 2 Drawing Sheets

CIRCUIT AND METHOD FOR CONTROLLING AN IR SOURCE FOR AN ANALYTICAL INSTRUMENT

CROSS-REFERENCE TO RELATED APPLICATIONS

This application claims priority under 35 U.S.C. §119(e) and the benefit of U.S. Provisional Application No. 61/451,718 entitled CIRCUIT AND METHOD FOR CONTROLLING AN IR SOURCE FOR AN ANALYTICAL INSTRUMENT, filed on Mar. 11, 2011, by Peter M. Willis et al., the entire disclosure of which is incorporated herein by reference.

BACKGROUND OF THE INVENTION

The present invention relates to a circuit and method of controlling the average power delivered to an infrared (IR) source or emitter used in a non-dispersive infrared detection cell (NDIR cell), An NDIR (non-dispersive infrared) cell is used to measure the quantity of a selected gas by means of IR absorbance. The main components of the cell are the infrared source or emitter, the sample chamber or light tube, a wavelength filter, and an infrared detector.

The IR signal from the emitter is typically modulated in some fashion so that thermal background signals can be removed from the desired measurement signal. Two methods often employed to modulate the emitter are to either mechanically chop the light or alternatively to pulse the electrical power delivered to the emitter. For the pulse modulation case, the electrical power supplied to the emitter is modulated at a frequency that causes the emitter to heat and cool thereby modulating the optical IR power emitted from its surface. The thermal response of the emitter must be sufficiently fast such that the depth of temperature modulation is adequate for the desired sensitivity at the selected modulation frequency.

One means to pulse power to the emitter is to pulse a voltage level to the emitter. This is referred to as the primary modulation. Usually, a 50% primary modulation is used where the emitter on-time and off-time are equal. During the off-time, the applied voltage can be a low voltage or zero volts. Preferably a non-zero voltage is used during the off-time to minimize the stress to the emitter frame during the pulsing. The primary modulation frequency can be selected to optimize signal-to-noise ratio of the NDIR while providing adequate response time for the bandwidth of the expected analyte signal. The instantaneous electrical power during the on-time is dependent upon the voltage applied to and the resistance of the emitter according to the following standard power equation:

$$\text{Power} = \frac{\text{Voltage}^2}{\text{Resistance}}$$

Often, the emitter resistance has a wide tolerance due to limitations in the manufacturing process, etc. If a constant voltage is pulsed to the emitter, a correspondingly wide range of power will be experienced. Since the sensitivity of the NDIR cell is dependent, among other things, upon the electrical power delivered to the IR emitter, a wide range of NDIR cell sensitivities will ensue. One means to minimize this variable sensitivity is to control the power to each IR emitter.

Since the resistance cannot be controlled by the end user, one option is to vary the emitter voltage level applied during the on-time to achieve constant power. This solution can be performed either with analog hardware, requiring a hardware control loop to be tuned for adequate response performance and stability, or it can be implemented using a digital control loop with a digital-to-analog (DAC) converter to adjust the voltage level. Because it may also be desirable to set the voltage to a non-zero value during the off-time, some means must be designed to allow the emitter voltage to switch between two voltage levels.

SUMMARY OF THE INVENTION

A less costly approach implemented by this invention is to pulse-width-modulate (PWM) the voltage applied to an IR emitter during the on-time in order to control the power to a predetermined desired level. The PWM is referred to as the secondary modulation. In one embodiment, the secondary modulation occurs at 800 Hz because it is approximately one decade passed the 11 ms temperature response time of a commercially available emitter. Therefore, the emitter will, in effect, filter this higher frequency, and it will appear that an average power is being applied to the emitter during the on-time. The primary modulation providing first and second times for the voltage applied to the emitter is, in a preferred embodiment, a 2.5 Hz square wave.

These and other features, objects and advantages of the present invention will become apparent upon reading the following description thereof together with reference to the accompanying drawings.

DETAILED DESCRIPTION OF THE PREFERRED EMBODIMENT

Figure 1:
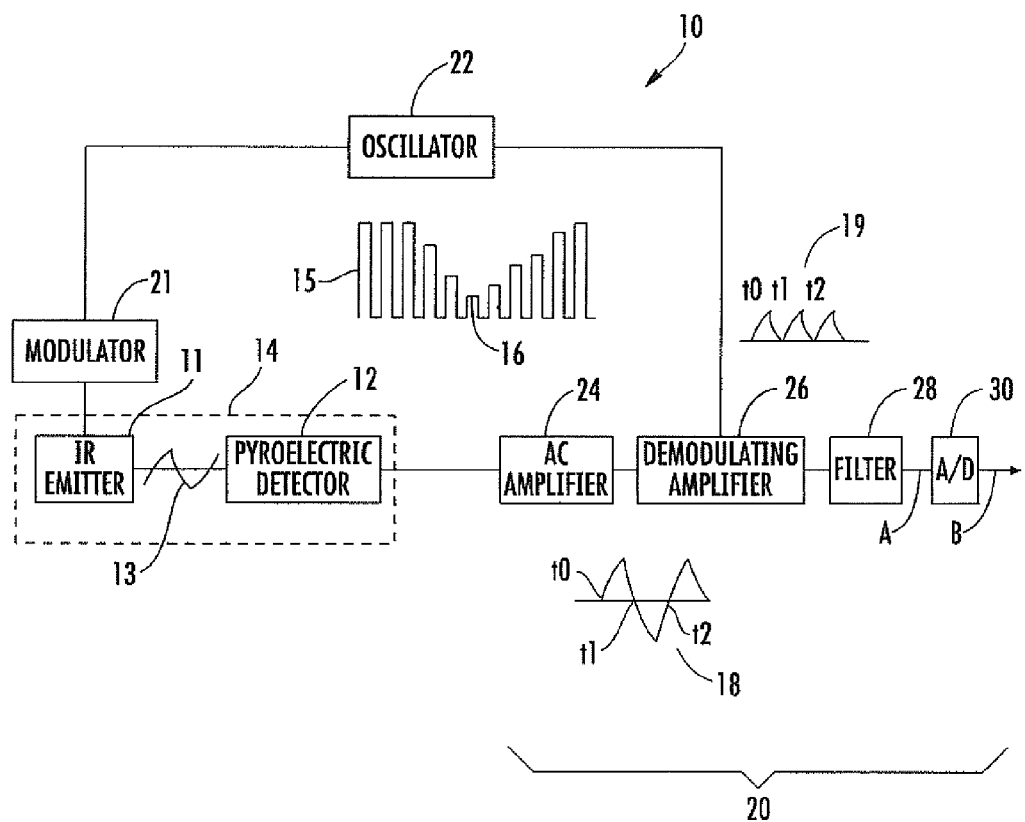
FIG. 1 is a circuit diagram of detection circuit for an analyzer which can employ the modulation system of this invention.

Referring initially to FIG. 1, there is shown a non-dispersive infrared (NDIR) detection system 10 of the present invention, which can be employed in an analyzer, such as a Model No. CS 844 analyzer (not shown). The analyzer is commercially available from Leco Corporation of St. Joseph, Mich., USA. The system comprises a pulsed infrared emitter 11 which is modulated according to the present invention by a drive circuit providing the signals shown in FIGS. 2 and 3 which are applied to the emitter. Emitter 11 is mounted in a temperature-controlled cell 14 through which a carrier gas, such as oxygen, flows and into which flow stream an analyte is introduced. The infrared cell construction, together with the mounting of a pyroelectric detector 12 in the cell 14, is conventional. The analyte supplied to the cell 14 will include fluids and/or gases which absorb infrared radiation including, for example, CO, $CO_2$, $SO_2$, and $H_2O$, and the like as examples only.

The infrared emitter 11 emits infrared radiation 13 which passes through the analyte flowing between the emitter 11 and detector 12. The detector provides pulse modulated AC varying output pulses represented by waveform 15, which may, for an oxygen carrier, have an output of, for example, 40 millivolts and dip, as indicated by waveform section 16, to a level of, for example, 20 millivolts as an analyte passes through the cell 14. This low level time-varying pulse modulated AC signal is applied to the circuit 20 of the present invention to provide a noise-free amplified output signal at output terminal A.

Figure 2:
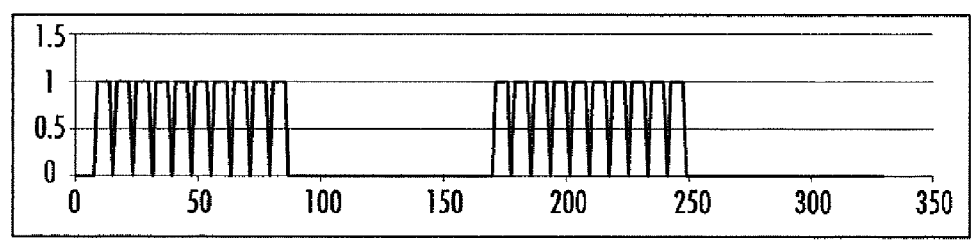
FIG. 2 is a first waveform diagram of the primary and secondary modulation signals applied to an emitter according to a preferred embodiment.
Figure 3:
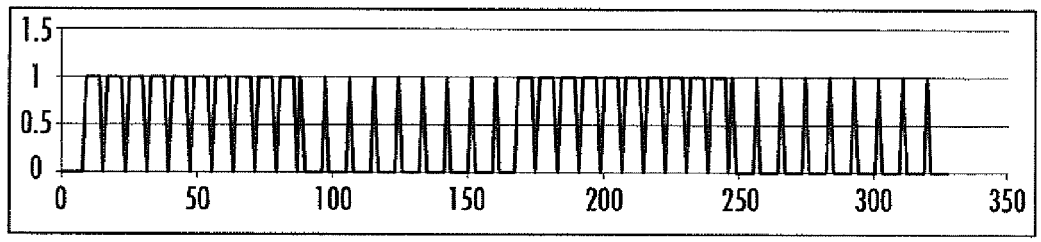
FIG. 3 is a second waveform diagram of the non-zero off-time duty cycle of the signals applied to an emitter according to a preferred embodiment of the invention.

Circuit 20 includes an oscillator 22 coupled to a modulator 21 for providing drive signals, as shown in FIGS. 2 and 3, which are applied to the emitter 11. In the preferred embodiment of the invention, oscillator 22 provided a primary modulation frequency of about 2.5 Hz, although frequencies slightly below and significantly above could also be employed.

The modulator 21 for emitter 11 can be a square wave generator and gate circuit driven by the oscillator 22 to provide a primary modulation signal of 2.5 Hz. Oscillator 22 also provides a secondary modulation frequency of the on-time of the primary signal of about 800 Hz. The secondary modulation frequency of 800 Hz is selected since it is approximately one decade faster than the 11 ms temperature response time of the emitter 11. Therefore, the emitter will filter this higher frequency, and it will appear that an average power is being applied to the emitter during the lower frequency on-time. The duty cycle for the secondary modulation is adjusted to achieve an average emitter power of 600 mW during the on-time.

Signals from detector 12 are applied to an amplifier 24 which is an operational amplifier, as described in greater detail below in connection with FIG. 2, to provide an alternate polarity output signal 18. This output signal from amplifier 24 is applied to a demodulating amplifier 26 also coupled to the oscillator 22 for receiving signals therefrom to invert one half of the signal 18 to provide a unipolar output signal 19 therefrom which is applied to a low pass filter 28 passing frequencies substantially at 3 Hz or below. The DC level output from filter 28, in turn, is coupled to an A-to-D converter 30 having an output at terminal B comprising a binary number representing the detected signal level of an analyte to be analyzed. The signal from A-to-D converter 30 is conventionally applied to a microprocessor associated with an analyzer to provide the operator with a readable output which is representative of not only the analyte detected but the level of analyte in a given specimen. The analyzer infrared cell and the combustion furnace associated with such an analyzer can be conventional components and do not form part of the present invention other than the environment in which the circuit of the present invention is employed.

FIG. 2 is a waveform illustrating the primary and secondary modulation periods. The time line is in milliseconds. The vertical axis is in volts.

If it is desirable to run the emitter at a lower non-zero average power during the primary modulation off-time, a non-zero duty cycle can be applied during the off-time as illustrated in the FIG. 3. In the drive circuit, both the emitter current and emitter voltage can be monitored during operation so that the power can be monitored. The secondary modulation duty cycle of both the on-time and off-time are adjusted as necessary to provide the required power levels. In one embodiment, the average power during the emitter off-time of 200 ms was 100 mW.

Figure 4:
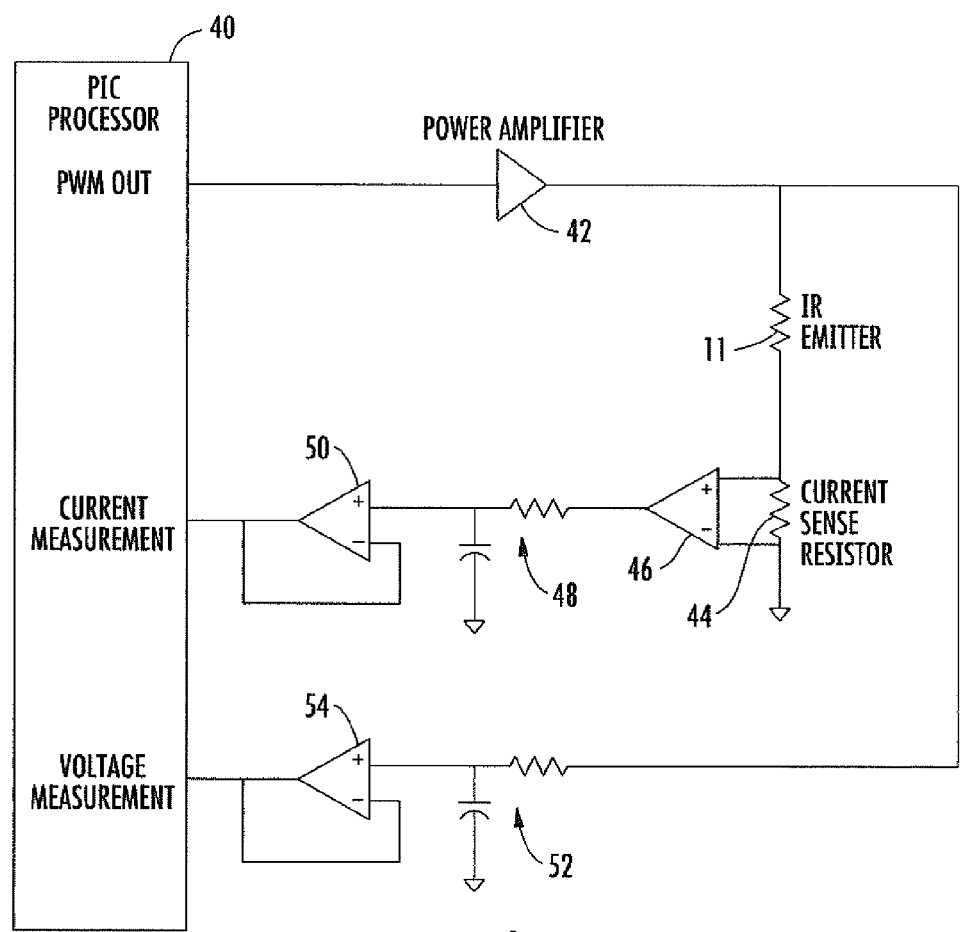
FIG. 4 is an electrical circuit diagram in block form of the drive circuit for the emitter.

The drive circuit of FIG. 4 for the control and measurement used to provide the control signals shown in FIGS. 2 and 3 is now described. The PIC microprocessor 40 produces the double modulated PWM signal. The power amplifier 42 converts this digital signal to the proper analog voltage levels and the necessary drive current for the IR emitter 11. A current sense resistor 44 is coupled in series with the emitter and senses the emitter current and buffers it using amplifier 46. A low-pass filter 48 is used to average the pulsed current signal into a slowly varying analog signal so that it can be read by a low speed analog digital converter (ADC) which is integrated into the microprocessor 40. Amplifier 50 buffers the filtered signal to produce the proper low-impedance input for the ADC channel if necessary.

The voltage signal from the power amplifier 42 is also applied to low-pass filter 52 to average the pulsed voltage waveform into a slowly varying analog signal for reading by a second channel of the ADC integrated into processor 40 via buffer amplifier 54. Both filters 48 and 52 are single-pole low-pass filters with cut-off frequency of 8 Hz.

The current measurement and voltage measurement are both read by the ADC at 100 Hz. 40 samples of each channel are averaged such that a full period of the 2.5 Hz first modulation period is averaged. The following equation is used to calculate the power delivered to the emitter for the waveform of FIG. 1.

$$AveragePower = \frac{AverageCurrentMeasurement * AverageVoltageMeasurement}{0.5(DC1 + DC2)}$$

In the above equation, DC1 refers to the duty-cycle of the on-time modulation (variable) and DC2 refers to the duty-cycle of the off-time modulation (variable). To control power, DC1 and DC2 are adjusted by the PIC as necessary until the desired average power is attained.

With this modulation system and method, therefore, commercially available emitters that have different temperature outputs for the same applied voltage can be individually tested and a secondary modulation duty cycle determined to assure that from instrument to instrument the IR emitters operate substantially identically binary.

It will become apparent to those skilled in the art that various modifications to the preferred embodiment of the invention as described herein can be made without departing from the spirit or scope of the invention as defined by the appended claims.

The invention claimed is:

1. A circuit for controlling an IR emitter for an analyzer comprising:

An IR emitter having an input and an output;

An oscillator which provide a first frequency modulation signal which is a square wave having on and off duration which are equal, said square wave first frequency modulation signal applied to said input of said IR emitter for powering said IR emitter, said oscillator further providing a second frequency modulation signal applied to said input of said IR emitter during an on-time of said first frequency modulation signal, wherein the frequency of said second frequency modulation signal is higher than the frequency of said first modulation signal;

A pyroelectric detector coupled to said output of said IR emitter; and

A second circuit coupled to said pyroelectric detector, said second circuit including an amplifier for providing unipolar output signals which are applied to a low pass filter for passing signals having a frequency corresponding to said first frequency modulation signal.

2. The circuit as defined in claim 1 wherein said first frequency modulation signal has a frequency of about 2.5 Hz.

3. The circuit as defined in claim 2 wherein the second frequency modulation signal has a frequency of about 800 Hz.

4. The circuit as defined in claim 1 wherein said oscillator provides an off-time of said first frequency modulation signal and, during the off-time of said first frequency modulation signal, a voltage is applied to the IR emitter that is pulsed to a non-zero value using a narrow duty cycle at said second modulation frequency.

5. A control circuit for an IR emitter used in an NDIR system for an analyzer comprising:
   An IR emitter;
   An oscillator providing a first frequency square wave having equal duration on and off periods for applying power to said IR emitter during both on and off cycles;
   Said oscillator pulsing said power during at least an off cycle at a second frequency; and
   A second circuit coupled to said IR emitter, said second circuit including an amplifier for providing unipolar output signals which are applied to a low pass filter for passing signals having a frequency corresponding to said first frequency signal.

6. The control circuit as defined in claim 5 wherein said first frequency signal is a square wave which has a frequency of about 2.5 Hz.

7. The control circuit as defined in claim 5 wherein said second frequency signal is about 800 Hz.

8. The control circuit as defined in claim 5 wherein during the period of said first frequency signal, a voltage is applied to said emitter at a non-zero level using a narrow duty cycle at said second frequency.

* * * * *

UNITED STATES PATENT AND TRADEMARK OFFICE
CERTIFICATE OF CORRECTION

Page 1 of 1

PATENT NO. : 9,243,954 B2
APPLICATION NO. : 13/400284
DATED : January 26, 2016
INVENTOR(S) : Willis et al.

It is certified that error appears in the above-identified patent and that said Letters Patent is hereby corrected as shown below:

Claims

Column 4, line 48, Claim 1, "An" should be --an--;

Column 4, line 49, Claim 1, "An" should be --an--;

Column 4, line 49, Claim 1, "provide" should be --provides--;

Column 4, line 50, Claim 1, "duration" should be --durations--;

Column 4, line 59, Claim 1, "A" should be --a--;

Column 4, line 61, Claim 1, "A" should be --a--;

Column 5, line 12, Claim 5, "An" should be --an--;

Column 5, line 13, Claim 5, "An" should be --an--;

Column 5, line 16, Claim 5, "Said" should be --said--;

Column 5, line 18, Claim 5, "A" should be --a--; and

Column 5, line 29, Claim 8, "period" should be --off-period--.

Signed and Sealed this
Twenty-sixth Day of April, 2016

Michelle K. Lee
*Director of the United States Patent and Trademark Office*